Nov. 17, 1953 T. E. LEONTIS ET AL 2,659,132
COMPOSITE ALLOY
Filed Aug. 16, 1950

INVENTORS.
Thomas E. Leontis
Robert S. Busk
BY
Griswold and Burdick
ATTORNEYS

Patented Nov. 17, 1953

2,659,132

UNITED STATES PATENT OFFICE 2,659,132

COMPOSITE ALLOY

Thomas E. Leontis and Robert S. Busk, Midland, Mich., assignors to The Dow Chemical Company, Midland, Mich., a corporation of Delaware Application August 16, 1950, Serial No. 179,775

8 Claims. (Cl. 29—182.2)

The invention relates to a magnesium-base alloy article. It more particularly concerns a composite metal body comprising a magnesium-base magnesium-zirconium alloy but having enhanced tensile strength and other desirable characteristics including the light weight exhibited by conventional magnesium-base alloys.

The term "magnesium-base alloy" used herein means a magnesium alloy containing at least 80% of magnesium by weight.

The invention is predicated upon the discovery that by die-expressing at elevated temperature the magnesium-base magnesium-zirconium alloy in particulated form in admixture with particulated silver, a high strength composite alloy extrusion is obtained. The composite alloy extrusion has the same compactness and integrity as the usual magnesium-base alloy extrusions made by extruding a solid mass, such as an ingot of a magnesium-base alloy, but the metallographic structure of the composite product is uniquely different. Metallographic examination reveals a new type of structure in a magnesium-base alloy article. The structure is essentially multimetallic. Each of the two particulate metals of the mixture which is extruded is changed into the form of elongated particles with the long axis parallel to that of the extrusion and these elongated particles are all welded one to the other into a solid mass without voids. The invention then consists of the composite magnesium-base alloy product and method of making the same herein fully described and particularly pointed out in the claims, the following description setting forth several modes of practicing the invention.

In carrying out the invention, the magnesium-zirconium alloy used may contain from about 0.1 to 0.8 per cent of zirconium. A preferable amount is about 0.3 per cent. The zirconium-containing magnesium-base alloy may also contain up to 2 per cent of cerium or mischmetal or up to 8 per cent of zinc, or up to 1 per cent of calcium or combinations of these alloying metals, the total amount of alloying metal not exceeding about 12 per cent. The alloy is used in particulate form such as may be obtained by grinding or preferably by atomization. The atomized form may be made by impinging a jet of a cool gas, e. g. natural gas, against a thin, falling stream of the molten alloy. Particles coarser than those passing through about a 10 to 20 mesh standard sieve are screened out and preferably also particles finer than about 200 mesh. In the atomized form the particles consist of fine rapidly solidified round particles having an extremely fine grain structure.

The silver may be comminuted in any convenient manner, e. g. grinding, so as to form it into particles as fine as and preferably finer than those of the magnesium-zirconium alloy.

The two particulated metals above-described are intimately mixed as by tumbling the two particulated metals in a tumbling barrel or in any other convenient manner, prior to the extrusion operation. The proportion of particulate silver may range from about 0.1 to 6 per cent by weight of the mixture. A preferred range of proportions is about 2 to 4 per cent, 3 per cent being generally the most desirable proportion.

The mixture of the particulated metals is charged into the heated container of a conventional ram extruder having a suitable container size and die opening to produce a substantial reduction in area. The reduction in area produced, as expressed by the ratio of the cross-sectional area of the container to that of the die opening, has a material effect on the mechanical properties of the composite extrusion obtained. In general, the higher the ratio the better the mechanical properties. A desirable ratio is at least 30 to 1, although ratios as high as 150 to 1 or more may be used.

The invention may be further illustrated and explained in connection with the accompanying drawing in which.

Figure 1:
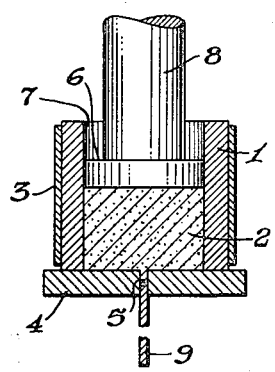
Fig. 1 shows a schematic sectional elevation of an extrusion apparatus suitable for use in practicing the invention.

As shown, the apparatus comprises, in its three forms, an extrusion container 1 adapted to confine a charge 2 of the mixture of the particles of the two metals to be co-extruded. The container is provided with a heating element 3. In Fig. 1, one end of the container 1 is closed by the die plate 4 in which is provided the die opening 5. In this form of the apparatus, the charge 2 is caused to be compacted in the container and extruded through the die opening 5 by application of pressure by means of the dummy block 6 forced into the bore 7 of the container by the ram 8 to form the composite alloy extrusion 9.

Figure 2:
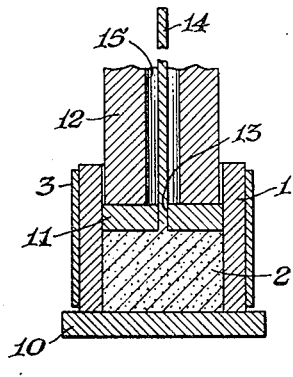
Fig. 2 is a similar view to Fig. 1 showing a modification of the apparatus.

In the form of the apparatus shown in Fig. 2, the container 1 is closed at one end by the plate 10. The other end of the container receives the die block 11 carried by the hollow ram 12 which forces the die block into the container causing the charge 2 to be compacted and to extrude through die opening 13 to form the composite alloy extrusion 14 which extends into bore 15 of the hollow ram 12.

Figure 3:
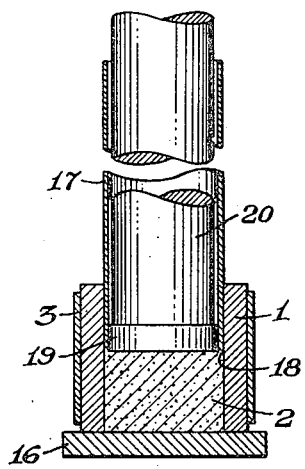
Fig. 3 is a similar view to Fig. 1 showing another modification of the apparatus.

In the modification of Fig. 3, the container 1 is closed at one end by a plate 16. The charge 2 is extruded as a tubular composite alloy extrusion 17 through the annulus 18 around the die block 19 while the block is forced into the container by the ram 20.

The forms of the apparatus shown are conventional.

By putting a charge of the mixture of particles of the two metals involved under pressure while at heat, as with the apparatus shown, the mixture of metal particles is compacted but not subjected to further mixing before extrusion. The metals in the charge as individual metal particles become welded together without voids and without losing their original distinctive composition except at the surface of the union of the different kinds of particles which become extended and lengthened during extrusion. At these surfaces during extrusion some intermixing occurs, as by diffusion, between the particles of the different kinds of metal in the extrusion charge, forming composite alloy. In this diffusion some of the silver diffuses into the surfaces of the magnesium-zirconium alloy particles and some of the magnesium-zirconium alloy particles diffuses into the silver. The composite alloy can be worked as by rolling, forging, pressing, etc., like conventional magnesium-base alloys.

The following examples are illustrative of the invention.

composite alloy extrusion. It should be noted that the composite alloy has the unique advantage of retaining high strength after prolonged heating at high temperature. This property enables the composite alloy to be hot worked as in bending, forging, rolling, drawing with reduced loss of strength.

We claim:

1. The method of making a solid composite article comprising magnesium alloyed with zirconium which comprises forming a mixture of a zirconium-containing magnesium-base alloy in particulate form and silver in particulate form, said alloy containing 0.1 to 0.8 per cent of zirconium, the balance being at least 88 per cent of magnesium, and die-expressing the mixture at a temperature between 600° and 710° F., the amount of silver in the mixture being from 0.1 to 6.0 per cent of the weight of the mixture.

2. The method according to claim 1 in which the zirconium-containing magnesium-base alloy also contains up to 2 per cent of cerium.

3. The method according to claim 1 in which the zirconium-containing magnesium-base alloy also contains up to 8 per cent of zinc.

4. The method according to claim 1 in which the zirconium-containing magnesium-base alloy also contains up to 1 per cent of calcium.

5. A composite metal body consisting of two particulated metals one of the metals being a magnesium-base alloy containing from 0.1 to 0.8 per cent of zirconium and the balance being at least 88 per cent of magnesium, the other being elementary silver in amount between 0.1 and 6 per cent by weight of the metal body, the particles of each of the metals being elongated, orientated in the same direction, and welded to-

*Table*

| Example No.— Blank No. | Composition of Extrusion Charge of Comminuted A Mixed with Comminuted Silver | | | Mechanical Properties[1] of Extrusions in 1,000's p. s. i. | | | | | | | | Extrusion | |
|---|---|---|---|---|---|---|---|---|---|---|---|---|---|
| | | | | As Extruded | | Aged | | H. T. | | H. T. A. | | | |
| | Wt. per-cent A | Analysis of A | Wt. per-cent A | TYS | TS | TYS | TS | TYS | TS | TYS | TS | Temp.°F. | Ft./min |
| 1 | 99.9 | 0.38% Zr, Bal. Mg | 0.1 | 27 | 37 | 28 | 39 | 28 | 38 | 28 | 39 | 670 | 2 |
| 2 | 99.5 | ___do___ | 0.5 | 27 | 36 | 27 | 36 | 31 | 38 | 30 | 38 | 680 | 2 |
| 3 | 94.0 | ___do___ | 6.0 | 24 | 35 | 31 | 38 | 37 | 43 | 39 | 43 | 680 | 2 |
| Blank 1 | 100 | none | none | 26 | 36 | 29 | 37 | 28 | 37 | 28 | 36 | 680 | <2 |
| Blank 2 | 99.9 | 100% Mg | 0.1 | 25 | 36 | 27 | 38 | 25 | 35 | 27 | 36 | 710 | 4 |
| Blank 3 | 99.5 | ___do___ | 0.5 | 27 | 37 | 28 | 36 | 25 | 31 | 27 | 36 | 710 | 2 |
| Blank 4 | 94.0 | ___do___ | 6.0 | 24 | 35 | 28 | 37 | 24 | 32 | 27 | 36 | 710 | 3 |
| Blank 5 | 100.0 | ___do___ | none | 27 | 36 | 27 | 36 | 20 | 29 | 22 | 30 | 675 | 3 |
| 4 | 99.5 | 0.36% Zr, 0.2% Ce, Bal. Mg. | 0.5 | 46 | 47 | 46 | 50 | 39 | 42 | 40 | 43 | 665 | 2 |
| 5 | 99.0 | ___do___ | 1.0 | 38 | 41 | 42 | 45 | 40 | 43 | 40 | 43 | 665 | 2 |
| 6 | 97.0 | ___do___ | 3.0 | 43 | 47 | 49 | 50 | 46 | 47 | 45 | 48 | 665 | 2 |
| 7 | 94.0 | ___do___ | 6.0 | 45 | 47 | 45 | 47 | 39 | 43 | 43 | 44 | 665 | <0.5 |
| Blank 6 | 100.0 | ___do___ | none | 44 | 47 | 45 | 46 | 29 | 37 | 27 | 38 | 665 | 2 |
| 8 | 97.0 | 0.24% Zr, Bal. Mg | 3.0 | 26 | 37 | 27 | 38 | 27 | 39 | | | 600 | 0.5 |
| Blank 7 | 100.0 | ___do___ | none | 23 | 35 | 25 | 36 | 26 | 36 | | | 600 | 0.5 |

[1] Aged=Heated 16 hours at 350° F.
H. T.=Heated 1 hour at 750° F.
H. T. A.=Heated 1 hour at 750° F. followed by heating for 16 hours at 350° F.

In Examples 1 to 7 and blanks 1 to 6, the container of the extrusion apparatus had a diameter of ½ inch and the die opening was 0.086 inch, thereby producing composite alloy wire 0.036 inch in diameter (reduction in area 34:1). In Example 8 and blank 7, the same size container was used but the die opening was 0.07 inch, thereby producing composite alloy wire 0.07 inch in diameter (reduction in area 50:1). Referring to the table, it will be seen that the beneficial effects of adding the silver to the magnesium-zirconium alloy, in the manner described, are especially noticeable on heat treating the gether into an integral solid.

6. The method according to claim 1 followed by subjecting the solid composite article to a heat treatment in which the article is subjected to a prolonged heating at a temperature of about 350° F.

7. The method according to claim 1 followed by subjecting the solid composite article to a heat treatment in which the article is subjected to a prolonged heating at a temperature of about 750° F.

8. The method according to claim 7 followed by subjecting the solid composite heat-treated article to a further heat treatment in which the article is subjected to a prolonged heating at about 350° F.

THOMAS E. LEONTIS.
ROBERT S. BUSK.

References Cited in the file of this patent

UNITED STATES PATENTS

| Number | Name | Date |
|---|---|---|
| 1,913,133 | Stout | June 6, 1933 |
| 2,024,767 | Jeffries et al. | Dec. 17, 1935 |
| 2,205,865 | Schwarzkoff | June 25, 1940 |
| 2,332,277 | Stern | Oct. 29, 1943 |
| 2,355,954 | Cremer | Aug. 15, 1944 |

FOREIGN PATENTS

| Number | Country | Date |
|---|---|---|
| 570,166 | Great Britain | June 26, 1945 |
| 570,906 | Great Britain | July 27, 1945 |
| 625,364 | Great Britain | June 27, 1949 |

OTHER REFERENCES

"Treatise on Powder Metallurgy" by Goetzel, vol. 2, pp. 500, 740, 741. Published in 1950.

"Symposium on Powder Metallurgy," Buffalo Spring Meeting, March 3, 1943, published by American Society for Testing Materials, Philadelphia, Pa., pages 42 and 43.